March 16, 1965  J. H. LEMELSON  3,173,195
METHOD OF MAKING DUCTED PANELLING
Filed Feb. 19, 1957
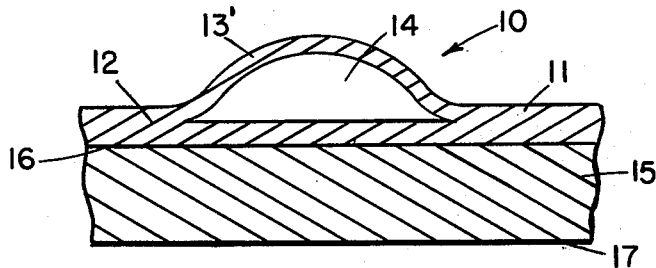
FIG. 1
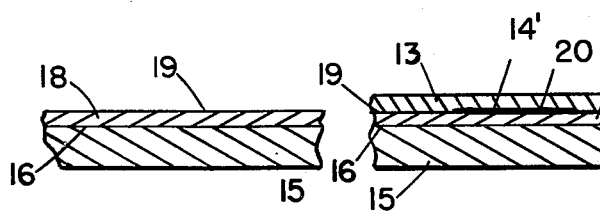
FIG. 2  FIG. 3  FIG. 4
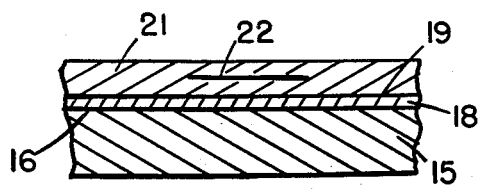 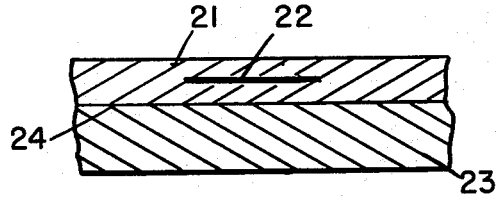
FIG. 5  FIG. 6
INVENTOR.
Jerome H. Lemelson United States Patent Office 3,173,195
Patented Mar. 16, 1965

3,173,195
METHOD OF MAKING DUCTED PANELLING
Jerome H. Lemelson, 85 Rector St., Metuchen, N.J.
Filed Feb. 19, 1957, Ser. No. 641,101
4 Claims. (Cl. 29—157.3)

This invention relates to a method of fabricating a metal sheet containing an integral conduit formed of the material of said sheet and is a continuation-in-part of application Serial Number 555,146 for Panel Construction which was filed on December 23, 1955, and is now abandoned: In particular, the invention relates to an improved structure in a conduit containing a sheet of metal made of a plurality of sheets or layers of metal having different physical characteristics and methods for producing same.

It is known in the art to fabricate a ducted or tubed sheet of metal by fusing two sheets of metal together with a release material, sometimes referred to as a stop-weld agent, applied as a strip area or pattern on a surface of one of said sheets whereby said release agent prevents fusion of said metal and provides a non-fused interfacial strip area or thin volume between said sheets, and expanding the metal on both sides of said non-fused interface by applying sufficient fluid pressure thereto. Metal sheets having so called non-fused interfacial strips are commercially available and bear the trade marks Roll-Bond and Tube-In-Strip metal. The conventional method of forming such a duct or tube pattern in the Roll-Bond or Tube-In-Strip sheet is to clamp or otherwise hold an edge of sheet while applying fluid pressure to said interfacial area through a nozzle inserted into an edge opening thereto. Such tubed sheets are generally fabricated of a pressure weldable metal, such as aluminum or copper. They have been used for various heat exchanger applications involving the movement of a fluid through the conduit formed in the sheet. Such applications have been limited in scope due to the structural limitations of the pressure weldable non-ferrous metal employed in fabricating the sheet and, in some instances, its melting point.

Accordingly, it is a primary object of this invention to provide a method for producing a new and improved sheet metal panel having a conduit formed integral with said sheet.

Another object is to provide a method for producing a panel containing an integral conduit by uniting at least three sheets of metal, one of which is more rigid than the others.

Another object is to provide a method for producing a new and improved panel containing an integral conduit and made of layers of ferrous and non-ferrous metals, the ferrous metal imparting improved strength and temperature corrosion resistance to the panel.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

In the drawings:

FIG. 1 is a view in cross section of a fragment of a duct-containing panel made in accordance with the teachings of this invention;

FIG. 2 is a cross-sectional view of a fragment of a portion of the panel of FIG. 1 prior to its fabrication and made in accordance with the first steps of a first procedure for producing said panel;

FIG. 3 is a view of the panel portion of FIG. 2 having an additional sheet material abutted thereagainst;

FIG. 4 is a view of the assembly of FIG. 3 after uniting the abutted members thereof and just prior to further fabrication to form the panel of FIG. 1;

FIG. 5 is a cross-sectional view of a fragment of a duct containing panel made in accordance with a second procedure; and FIG. 6 is a cross-sectional view of a fragment of a duct containing panel made in accordance with a third procedure.

There is shown in FIG. 1 details of the structure of a conduit containing panel 10 made in accordance with the teachings of this invention. The panel 10 is comprised of a base member 15 such as a sheet or plate of metal having a conduit containing sheet or panel 11 secured to its upper surface 16. Member 11 is preferably made of a non-ferrous metal such as aluminum or copper which, in its original form comprised two or more layers or sheets of said metal having a non-fused interfacial strip volume provided between the major surfaces thereof to which volume sufficient fluid pressure has been applied to expand a portion 13' thereof outwardly from the remaining portion 12 of the panel 11 to provide the duct-like formation illustrated which defines a passageway 14 extending through the sheet.

The panel 10 of FIG. 1 has certain advantages over the conventional roll-bonded conduit containing tubed sheet. Not only may said panel 10 be easily fabricated with any suitable conduit formation or formations provided therein for fluid or heat transfer and structural purposes, but it may be constructed to exhibit substantially greater strength than the conventional roll-bonded sheet containing integral duct formations and made of aluminum or copper per se, as a result of the improved structural characteristics imparted to the panel by the base member 15. Furthermore, since the base sheet or layer 15 may comprise a ferrous metal such as stainless steel or other metals or alloys having higher melting points than the metal comprising the conduit forming member or strata, the new and improved ducted panel may be utilized in higher temperature environments than the conventional non-ferrous, conduit-containing sheet material of the prior art.

A number of procedures may be followed in fabricating the panel 10 of FIG. 1 and are illustrated in FIGS. 2 to 6. In a first method, the base sheet or panel 15 is made of any suitable material capable of receiving and retaining a coating or layer 18 of roll bondable metal such as aluminum, copper or other non-ferrous metal. Said base 15 may comprise, for example, a ferrous alloy such as carbon steel or stainless steel which exhibits substantially greater strength than the metal of layer 18. Aluminum, for example, may be coated, cladded or molecularly bonded to the upper surface 16 of base 15 by conventional means to provide an integral formation of the two metals. In FIG. 3, a second sheet 13 of non-ferrous metal is molecularly bonded to the outer surface 19 of layer 18 after providing a release material in the form of a strip 20 to the surface of either layer 18 or member 13. Various release materials are known in the art of roll-bonding non-ferrous metals and are operative to prevent the molecular bonding or welding of those areas between two sheets to which they are applied when said sheets are compressed and welded together as in a rolling mill. Such so called "stop-weld" materials may comprise mixtures of carbon or other friable materials in a resin or other liquid permitting their application to and retention on a surface in a predetermined strip area or pattern.

In FIG. 4, layer 18 and sheet 13 have been roll-bonded together save in the area of the interfacial strip-like volume 14' defined by stop weld material 20, which area remains unbonded thereby forming a portion 11' of a panel which may be inflated to form a conduit. Thereafter, the application of sufficient fluid pressure to the volume defined at 14' may be effected to cause that portion 11' adjacent strip-volume 14' to expand outwardly and provide a conduit formation such as 13' of FIG. 1. The metal on the other side of strip-like conduit 14' is restrained from movement by the base panel or sheet 15 so that the face 17 of the panel 10 retains its original shape.

In a second procedure, illustrated in FIG. 5, a base member or sheet 15 of the type described, has a layer 18 of non-ferrous metal coated or cladded thereon as described. Thereafter, a second panel or sheet 21 of metal which has been roll-bonded or otherwise provided with a non-fused flat interfacial strip volume 22 or pattern of the type hereinabove described, is abutted against the upper surface 19 of 18 and molecularly bonded thereto as in a rolling mill under sufficient pressure and with or without heating to effect said molecular bonding. Thereafter, the non-bonded interfacial volume 22 is pressurized sufficiently to outwardly bulge the material of sheet 21 which is adjacent volume 22 and to provide an integral conduit formation of increased volume as illustrated in FIG. 1. Here again, the material on the other side of strip volume 22 remains undeformed.

In a third procedure, illustrated in FIG. 6, a sheet 21 of metal containing an interfacial strip-like volume 22, as described, is applied directly to the surface 24 of a base member or sheet 23 and is welded or molecularly bonded thereto. If the base sheet 23 is a ferrous metal or alloy such as steel, it will have a higher melting point than sheet 21. Thus 23 may be heated to near the melting point of the material of sheet 21 whereafter the two members may be rolled together in a rolling mill to cause them to become welded or molecularly united into a unitary panel having the interfacial strip volume retained in the layer thereof defined by sheet 21. Thereafter, sufficient fluid pressure may be applied to volume 22 to cause inflation of the sheet and formation thereof as illustrated in FIG. 1.

I claim:

1. The process of manufacturing a ducted panel which is fabricated from a welded assembly of three layers of metal including a first ferrous metal base member of substantial rigidity which comprises the major thickness of said assembly, a second metal layer in abutment with a surface of said base member and made of a non-ferrous metal, and a third non-ferrous metal abutting the outer surface of said second metal member, said process comprising heating said first base metal to a temperature near the melting point of the material of said metal comprising said second layer, applying said metal second layer to said first ferrous metal base while at said temperature and molecularly welding the two metals together, abutting said third layer of non-ferrous metal to the outer surface of said second non-ferrous metal layer after applying a stop-weld material arranged in a strip-pattern applied between the two surfaces, pressure welding the two layers of non-ferrous metal together save in the area therebetween bounded by said stop-weld material which provides a continuous passageway between the two, providing an opening between the non-ferrous layers to said passageway, fastening a fluid connection to said opening, and applying sufficient fluid pressure thru said fluid connection to separate and move apart only that portion of the outer sheet of non-ferrous metal adjacent said passageway to enlarge said passageway, the material adjacent said passageway of the second layer welded to said ferrous metal base member being prevented from deformation by said base member which retains its shape during the application of said fluid pressure.

2. The process of manufacturing a ducted panel which is fabricated from a plurality of sheets of metal including a first sheet of metal of substantial rigidity which comprises a the major thickness of said panel and a second portion of said panel which consists of an assembly of two sheets of non-ferrous metal forming a two layer flat sheet having molecularly welded united portions lying between narrower non-bonded double walled portions separated by stop weld material and providing a continuous passageway, which process comprises molecularly welding a layer of non-ferrous metal to one surface of said first sheet of metal, pressure welding a surface of said two layer flat sheet to the outer surface of said layer of non-ferrous metal thruout its entire area of contact therewith, whereby to form a single panel of integral structure, applying a fluid pressure thru an opening in said two layer flat sheet connecting with said non-bonded double walled portions, to separate and move apart only that portion of the non-bonded double walled portions of said two layer flat sheet which forms the outer layer thereof whereby to form a passageway in said panel, the portion of the non-bonded double walled portions of said two layer flat sheet which abuts said first sheet of metal being prevented from deformation by said first sheet which retains its shape during the application of said fluid pressure.

3. The process of manufacturing a ducted panel which is fabricated in part from an assembly of two sheets of non-ferrous metal forming a first two layer flat sheet having molecularly welded united portions lying between narrower non-bonded double walled portions separated by stop-weld material and providing a continuous passageway thru said flat sheet and a second sheet of ferrous metal of substantially greater rigidity than said first two layer flat sheet, which process comprises heating said second sheet of ferrous metal to a temperature near the melting point of the material of said first two layer flat sheet, placing a surface of said first two layer sheet on a surface of said second sheet and passing said first and second sheets as assembled thru a rolling mill while at said temperature in a manner to molecularly weld the first and second sheets together, providing an opening in said two layer flat sheet connecting with said non-bonded portions, fastening a fluid connection to said opening, and applying sufficient fluid pressure thru said fluid connection to separate and move apart only that part of the non-bonded portion of said two layer flat sheet which forms the outer layer thereof to form a passageway in said panel, the non-bonded portion of said two layer flat sheet which is welded to said second sheet of ferrous metal being prevented from deformation by said second sheet which retains its shape during the application of said fluid pressure.

4. The process of manufacturing a ducted panel which is fabricated in part from an assembly of two sheets of metal forming a first two layer flat sheet having molecularly welded united portions lying between narrower non-bonded double walled portions separated by stop-weld material and providing a continuous passageway thru said first flat sheet and a second sheet of metal of substantially greater rigidity than said first two layer flat sheet, which process comprises welding one surface of said first two layer flat sheet to said second sheet of metal of greater rigidity, providing an opening in said first two layer flat sheet connecting with said non-bonded portions, fastening a fluid connection to said opening, and applying sufficient fluid pressure thru said fluid connection to separate and move apart only that part of the non-bonded portion of said first two layer flat sheet which forms the outer layer thereof to form an enlarged passageway in said panel, the non-bonded portion of said first two layer flat sheet which abuts and is welded to said second sheet of metal of greater rigidity being prevented from deformation thereby which retains its shape during the application of said fluid pressure.

(References on following page)

References Cited in the file of this patent

UNITED STATES PATENTS

| | | |
|---|---|---|
| 1,488,936 | Parker | Apr. 1, 1924 |
| 1,723,659 | Rosenqvist | Aug. 6, 1929 |
| 1,978,319 | Mowery | Oct. 23, 1934 |
| 2,064,141 | Askin | Dec. 15, 1936 |
| 2,212,481 | Sendzimir | Aug. 20, 1940 |
| 2,246,362 | Kehoe et al. | June 17, 1941 |
| 2,333,343 | Sendzimir | Nov. 2, 1943 |
| 2,472,937 | Brinkoeter | June 14, 1949 |
| 2,581,760 | Harpoothian et al. | Jan. 8, 1952 |
| 2,587,116 | Clay | Feb. 26, 1952 |
| 2,673,425 | Karnell | Mar. 30, 1954 |
| 2,690,002 | Grenell | Sept. 28, 1954 |
| 2,697,670 | Gaudenzi et al. | Dec. 21, 1954 |
| 2,723,092 | Paselk et al. | Nov. 8, 1955 |
| 2,728,124 | Sofield | Dec. 27, 1955 |
| 2,757,445 | Anger | Aug. 7, 1956 |
| 2,766,514 | Adams | Oct. 16, 1956 |
| 2,845,695 | Grenell | Aug. 5, 1958 |
| 3,098,290 | Thomas et al. | July 23, 1963 |